(12) United States Patent
Gong (10) Patent No.: US 10,917,876 B2
(45) Date of Patent: Feb. 9, 2021

(54) METHOD AND SYSTEM FOR ALLOCATING CHANNEL

(71) Applicant: BOE TECHNOLOGY GROUP CO., LTD., Beijing (CN)

(72) Inventor: Weibing Gong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/399,713

(22) Filed: Apr. 30, 2019

(65) Prior Publication Data
US 2020/0068527 A1 Feb. 27, 2020

(30) Foreign Application Priority Data
Aug. 24, 2018 (CN) .......................... 2018 1 0975042

(51) Int. Cl.
*H04W 72/00* (2009.01)
*H04W 72/04* (2009.01)
(Continued)

(52) U.S. Cl.
CPC ....... *H04W 72/005* (2013.01); *H04W 72/048* (2013.01); *H04W 72/0446* (2013.01); *H04W 72/10* (2013.01); *H04W 84/005* (2013.01)

(58) Field of Classification Search
CPC .......... H04W 4/06; H04W 4/40; H04W 4/42; H04W 4/44; H04W 4/46; H04W 4/80;
(Continued)

(56) References Cited

U.S. PATENT DOCUMENTS

| 8,483,700 | B2 * | 7/2013 | Kim | H04W 48/18 455/452.1 |
| 8,560,609 | B2 * | 10/2013 | Nathanson | G07C 5/008 370/341 |

(Continued)

FOREIGN PATENT DOCUMENTS

| CN | 101636933 A | 1/2010 |
| CN | 101754099 A | 6/2010 |

(Continued)

OTHER PUBLICATIONS

First Office Action issued in Chinese Application No. 2201810975042.5 dated Dec. 3, 2020 with English translation, (19p).

(Continued)

*Primary Examiner* — Tri H Phan
(74) *Attorney, Agent, or Firm* — Arch & Lake LLP (57) ABSTRACT

The present disclosure provides a method and a system for allocating a channel. The method for allocating a channel includes determining, by a first communication node in an Internet of Vehicles, a second communication node in the Internet of Vehicles in a first channel allocation period. The second communication node is a communication node other than the first communication node in a communication range of the first communication node. The method includes allocating s channels among channels allowed to be allocated by the first communication node to s communication nodes. Different channels are allocated to different ones of the s communication nodes. s is a smaller value of n and m. n is a determined number of the communication nodes. m is a number of channels allowed to be allocated by the first communication node.

17 Claims, 4 Drawing Sheets

(51) Int. Cl.
*H04W 72/10* (2009.01)
*H04W 84/00* (2009.01)

(58) Field of Classification Search
CPC ... H04W 72/00; H04W 72/005; H04W 72/04;
H04W 72/0446; H04W 72/048; H04W
72/10; H04W 84/005; H04W 74/0816;
H04W 84/12
See application file for complete search history.

(56) References Cited

U.S. PATENT DOCUMENTS

| | | | | |
|---|---|---|---|---|
| 9,633,562 | B2* | 4/2017 | Nathanson | G07C 5/008 |
| 10,383,147 | B2* | 8/2019 | Rajagopal | H04W 28/0284 |
| 10,440,687 | B2* | 10/2019 | Wei | H04W 72/04 |
| 10,652,712 | B2* | 5/2020 | Hehn | H04B 17/318 |
| 10,728,892 | B2* | 7/2020 | Feng | H04W 16/02 |
| 2019/0373609 | A1* | 12/2019 | Kim | H04W 36/06 |
| 2020/0017108 | A1* | 1/2020 | Bae | G08G 1/096708 |
| 2020/0120458 | A1* | 4/2020 | Aldana | H04W 28/22 |

FOREIGN PATENT DOCUMENTS

| | | |
|---|---|---|
| CN | 103415082 A | 11/2013 |
| CN | 105722231 A | 6/2016 |
| CN | 106658523 A | 5/2017 |
| CN | 107005880 A | 8/2017 |
| CN | 107295657 A | 10/2017 |

OTHER PUBLICATIONS

Yin, Yong, "Research on Multi-hop Broadcast Protocol of Emergency Safety Messages in Internet of Vehicles," dated Dec. 31, 2015, (4p).

* cited by examiner

METHOD AND SYSTEM FOR ALLOCATING CHANNEL

CROSS REFERENCE

This application is based upon and claims priority to Chinese Patent Application No. 201810975042.5, filed on Aug. 24, 2018, the entire contents thereof are incorporated herein by reference.

TECHNICAL FIELD

The present disclosure relates to the technical field of data broadcasting in Internet of Vehicles, and in particular, to a method and a system for allocating a channel.

BACKGROUND

With the development of information technology, the Internet of Things has become a hot issue in current research, and the Internet of Vehicles technology has been applied in our daily lives.

In the Internet of Vehicles, limited by certain factors, the number and coverage of signal sources are limited, and there will inevitably be areas with weak signals or even no signal. Vehicles entering such areas generally connect to an on board unit (OBU) of a vehicle in an areas with strong signals in a self-organizing manner, to receive signals sent by the signal source. However, in the currently used Wireless Access in Vehicular Environment (WAVE) Internet of Vehicles protocol, Enhanced Distributed Channel Access (EDCA) mechanism is used to implement channel allocation and service priority queuing, while in EDCA, Carrier Sense Multiple Access/Collision Avoidance (CSMA/CA) protocol is used to implement channel access, that is to say, only two nodes can communicate between the same communication range at the same time, resulting in low efficiency of broadcast and data transmission at the Medium Access Control (MAC) layer.

SUMMARY

In a first aspect, a method for allocating a channel is provided. The method includes determining, by a first communication node in an Internet of Vehicles, a second communication node in the Internet of Vehicles in a first channel allocation period. The second communication node is a communication node other than the first communication node in a communication range of the first communication node. The method includes allocating s channels among channels allowed to be allocated by the first communication node to s communication nodes. Each of the s communication nodes includes the second communication node. Different channels are allocated to different ones of the s communication nodes, s is a smaller value of n and m, n is a determined number of the s communication nodes, and m is a number of channels allowed to be allocated by the first communication node.

In some arrangements, the method for allocating a channel further includes in the first channel allocation period, marking an unallocated channel in the channels allowed to be allocated by the first communication node as a reserved channel. In a second channel allocation period, when detecting that a second communication node that has been allocated with a channel, has moved out of the communication range of the first communication node, the method further includes marking the channel allocated to the second communication node as a reserved channel. The second channel allocation period is any channel allocation period after the first channel allocation period. In the second channel allocation period, the method further includes allocating the reserved channel to a current unallocated second communication node. The current unallocated second communication node includes a second communication node that is detected to move into the communication range of the first communication node in the second channel allocation period. A second communication node that is not allocated with a channel in a channel allocation period previous to the second channel allocation period.

In some arrangements, determining a second communication node in the Internet of Vehicles in a first channel allocation period includes broadcasting identity request information, the identity request information being used to request an identifier of the second communication node. Determining a second communication node includes receiving identity feedback information sent by the second communication node through a channel, and recording an identifier of the second communication node included in the received identity feedback information. When at least two second communication nodes send identity feedback information through the same channel, the method may return to the step of broadcasting identity request information until there are no at least two second communication nodes sending identity feedback information through the same channel.

In some arrangements, allocating s channels among channels allowed to be allocated by the first communication node to s second communication nodes includes sequentially allocating channels to the second communication nodes in an order of priorities of access categories of the second communication nodes, until the s channels are allocated.

In some arrangements, sequentially allocating channels to the second communication nodes in an order of priorities of access categories of the second communication nodes, until the s channels are allocated includes selecting a second communication node to be allocated a channel as a target node according to the order of the priorities of the access categories of the second communication nodes from high to low. Sequentially allocating channels to the second communication nodes includes selecting a channel from the channels allowed to be allocated by the first communication node, to be allocated to the target node. Sequentially allocating channels to the second communication nodes includes identifying information indicating that the currently allocated channel is suitable, which is fed back by the target node. When no information indicating that the currently allocated channel is suitable is identified, sequentially allocating channels to the second communication nodes includes selecting a channel again from the channels allowed to be allocated by the first communication node, and allocating the same to the target node, until all of the s channels have been tried. Sequentially allocating channels to the second communication nodes includes allocating a channel to the next target node until the s channels are allocated.

In some arrangements, allocating s channels among channels allowed to be allocated by the first communication node to s second communication nodes further includes when the determined number n of the second communication nodes is greater than the number m of the channels allowed to be allocated by the first communication node, stopping the allocation of the channel for a second communication node of which a transmission opportunity reaches the maximum transmission time.

In some arrangements, the method for allocating a channel further includes detecting whether a signal strength transmitted by a third communication node is lower than a threshold. When detecting that the strength is lower than the threshold, the method includes performing the step of determining a second communication node in the Internet of Vehicles in the first channel allocation period. The third communication node is a communication node that allocates a channel to the first communication node.

In some arrangements, before the step of determining a second communication node in the Internet of Vehicles in the first channel allocation period, the method further includes detecting whether start communication information broadcast by the third communication node is received. The start communication information is used for notifying the first communication node to start broadcasting. When the start communication information is received, the method includes performing the step of determining a second communication node in the Internet of Vehicles in the first channel allocation period.

In a second aspect, a system for allocating a channel, including a node determining module configured to cause a first communication node in an Internet of Vehicles to determine a second communication node in the Internet of Vehicles in a first channel allocation period. The second communication node is a communication node other than the first communication node in a communication range of the first communication node. The system includes a channel coloring module configured to allocate s channels among channels allowed to be allocated by the first communication node to s second communication nodes. Different channels are allocated to different second communication nodes, s is a smaller value of n and m, n is a determined number of second communication nodes, and m is a number of channels allowed to be allocated by the first communication node.

In some arrangements, the system for allocating a channel further includes a channel marking module configured to, in the first channel allocation period, mark an unallocated channel in the channels allowed to be allocated by the first communication node as a reserved channel. In a second channel allocation period, when detecting that a second communication node that has been allocated with a channel, has moved out of the communication range of the first communication node, the channel marking module is configured to mark the channel allocated to the second communication node as a reserved channel. The second channel allocation period is any channel allocation period after the first channel allocation period. The channel coloring module is further configured to, in the second channel allocation period, allocate the reserved channel to a current unallocated second communication node. The current unallocated second communication node includes a second communication node that is detected to move into the communication range of the first communication node in the second channel allocation period, and/or a second communication node that is not allocated with a channel in a channel allocation period previous to the second channel allocation period.

In some arrangements, the node determining module is configured to broadcast identity request information, and the identity request information is used to request an identifier of the second communication nodes. The node determining module is configured to receive identity feedback information sent by the second communication node through a channel, and record an identifier of the second communication node included in the received identity feedback information. When at least two second communication nodes send identity feedback information through the same channel, the node determining module is configured to return to the step of broadcasting identity request information until there are no at least two second communication nodes sending identity feedback information through the same channel.

In some arrangements, the channel coloring module is configured to sequentially allocate channels to the second communication nodes in an order of priorities of access categories of the second communication nodes, until the s channels are allocated.

In some arrangements, the channel coloring module is configured to select a second communication node to be allocated a channel as a target node according to the order of the priorities of the access categories of the second communication nodes from high to low. The channel coloring module is configured to select a channel from the channels allowed to be allocated by the first communication node, to be allocated to the target node. The channel coloring module is configured to identify information indicating that the currently allocated channel is suitable, which is fed back by the target node. When no information indicating that the currently allocated channel is suitable is identified, the channel coloring module is configured to select a channel again from the channels allowed to be allocated by the first communication node, and allocate the same to the target node, until all of the s channels have been tried; and allocate a channel to the next target node until the s channels are allocated.

In some arrangements, the channel coloring module is further configured to, when the determined number n of the second communication nodes is greater than the number m of the channels allowed to be allocated by the first communication node, stop the allocation of the channel for a second communication node of which a transmission opportunity reaches the maximum transmission time.

In some arrangements, the system for allocating a channel further includes a processing module configured to detect whether a signal strength transmitted by a third communication node is lower than a threshold. When detecting that the strength is lower than the threshold, the processing module is configured to cause the node determining module to determine a second communication node in the Internet of Vehicles in the first channel allocation period. The third communication node is a communication node that allocates a channel to the first communication node;

In some arrangements, the processing module is further configured to detect whether start communication information broadcast by the third communication node is received, wherein the start communication information is used for notifying the first communication node to start broadcasting. When the start communication information is received, the node determining node determines the second communication node in the Internet of Vehicles in the first channel allocation period.

In a third aspect, a computer readable storage medium has stored therein instructions. When the instructions are run in a system for allocating a channel, the system for allocating a channel is caused to perform the method for allocating a channel in the first aspect.

In a fourth aspect, a computer program product includes instructions. When the computer program product is run in a system for allocating a channel, the system for allocating a channel is caused to perform the method for allocating a channel in the first aspect.

BRIEF DESCRIPTION OF THE DRAWINGS

In order to more clearly illustrate the arrangements of the present disclosure or the technical solutions in the related art, accompanying drawings used in the arrangements or the description of the related art will be briefly described below. Apparently, the drawings in the following description are only some arrangements of the present disclosure, and other drawings can be obtained from these arrangements by those skilled in the art without any creative effort.

DETAILED DESCRIPTION

The technical solutions in the arrangements of the present disclosure are clearly and completely described in the following with reference to the accompanying drawings in the arrangements of the present disclosure. Apparently, the described arrangements are only a part of the arrangements of the present disclosure, not all of the arrangements. All other arrangements obtained by a person of ordinary skill in the art based on the arrangements of the present disclosure without creative effort all belong to the protection scope of the present disclosure.

Figure 1:
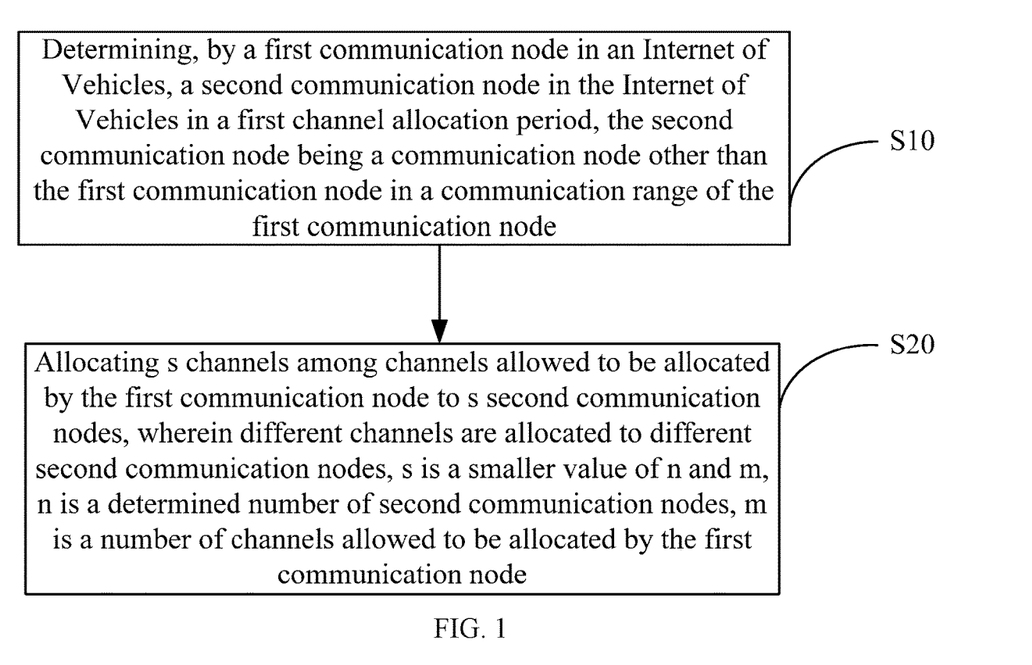
FIG. 1 is a flowchart of a method for allocating a channel according to an arrangement of the present disclosure.

An arrangement of the present disclosure provides a method for allocating a channel, as shown in FIG. 1, including the following blocks.

In block S10, a first communication node in an Internet of Vehicles determines a second communication node in the Internet of Vehicles in a first channel allocation period, the second communication node being a communication node other than the first communication node in a communication range of the first communication node.

Here, the first communication node and the second communication node are not limited, as long as signal transmission between the two can be performed based on a certain protocol. For example, the first communication node and the second communication node may be at least one of a Road Side Unit (RSU) and an On Board Unit (OBU), and the first communication node and the second communication node may perform signal transmission based on 802.11 protocol, and the first communication node and the second communication node respectively store the 802.11 protocol.

The frame format of the signal interaction between the first communication node and the second communication node may refer to the Request To Send/Clear To Send (RTS/CTS) frame format in the 802.11 standard.

In some arrangements, block S10 includes the following operations.

In a first operation of block S10, identity request information is broadcast, where the identity request information is used to request an identity of the second communication node.

That is, the first communication node transmits the identity request information in a broadcast manner, and all the second communication nodes located in the communication range of the first communication node can receive the identity request information.

In a second operation of block S10, identity feedback information sent by the second communication node is received through a channel, and an identifier of the second communication node included in the received identity feedback information is recorded.

That is, after receiving the identity request information sent by the first communication node, each second communication node selects a channel to reply the identity feedback information to the first communication node. At this time, the identity feedback information can be replied through a contention channel, but when a plurality of second communication nodes reply the identity feedback information through the same channel at the same time, the plurality of pieces of identity feedback information will collide. The first communication node cannot identify the identity feedback information of the second communication nodes that reply the identity feedback information through the same channel. The second communication nodes may all back off. For the identity feedback information that does not collide, the first communication node may decode the information, and after receiving the identity feedback information, the first communication node records the identifier of the corresponding second communication node.

The identity feedback information may further include a channel used by the second communication node to reply to the identity feedback information, preferentially allocating the channel to the corresponding second communication node when performing channel allocation, or informing the second communication node backed off to preferentially use the channel recorded by the first communication node when the second communication node replies identity feedback information at the next time, so as to reduce the probability of collision.

In order to let the second communication node know that it needs to back off, for example, the first communication node may broadcast identity feedback confirmation information, the second communication node that does not receive the identity feedback confirmation information is the second communication node to back off. Other implementation is also possible.

In a third operation of block S10, when at least two second communication nodes send identity feedback information through the same channel, the process returns to the step of broadcasting identity request information until there are no at least two second communication nodes sending identity feedback information through the same channel.

That is, the first and second operations of block S10 need to be repeatedly performed for the second communication node backing off, until there are no at least two second communication nodes sending identity feedback information through the same channel (no message collision). If when the first and second operations of block S10 are performed for the first time, there are no at least two second communication nodes sending identity feedback information through the same channel, the third operation of block S10 may be skipped.

In order to avoid the problem of repeated reception of the identity feedback information when the first and second operations of block S10 are repeatedly performed, for example, each time step the first operation is performed, the identity request information broadcast by the first communication node is the same, but the second communication node with identifier has been recorded by the first communication node will not reply identity feedback information. Alternatively, every time the first operation is performed, the identity request information broadcast by the first communication node is different, and the second communication node with identifier has been recorded by the first communication node will not receive the new identity request information. It is also possible that the second communication node with identifier has been recorded by the first communication node may receive the identity request information, but the identity request information indicates that the second communication node does not need to reply identity feedback information. Other implementation is also possible, which is not limited in the arrangement of the present disclosure.

In addition, In order to determine that there is no at least two second communication nodes sending identity feedback information through the same channel, for example, it may be that no identity feedback information is received within a preset time period, or the first communication node does not receive any information that cannot be identified.

The frame formats used for the identity request information and the identity feedback information are not limited. For example, the broadcasting RTS/broadcasting CTS (BRTS/BCTS) frame format may be used, as shown in Table 1 and Table 2.

TABLE 1

| BRTS frame format | | | | | |
|---|---|---|---|---|---|
| 2 | 2 | 6 | 6 | 1 | 4 |
| BRTS Control | Duration | RA | TA | CH | FCS |
| | MAC header | | | | |

TABLE 2

| BCTS frame format | | | | | |
|---|---|---|---|---|---|
| 2 | 2 | 6 | 6 | 1 | 4 |
| BCTS Control | Duration | RA | TA | CH | FCS |
| | MAC header | | | | |

The BRTS and BCTS structures in Table 1 and Table 2 are identical, in which the BRTS Control (BRTS Control Domain) and BCTS Control (BCTS Control Domain) in the Frame Control (Frame Control Domain) in the MAC header are used to define a protocol version, a frame type, a fragmentation, a number of retries, etc.; Duration indicates the approximate backoff time of the second node that has collision; RA indicates the receiving station address (generally a MAC address); TA indicates a sending station address (generally a MAC address); FCS is a frame check field; and CH is a new domain, indicating a channel allocated by the first communication node to the second communication node.

In block S20, s channels among channels allowed to be allocated by the first communication node are allocated to s second communication nodes, wherein different channels are allocated to different second communication nodes, s is a smaller value of n and m, n is a determined number of second communication nodes, m is a number of channels allowed to be allocated by the first communication node.

According to the density of the vehicle, the number n of the second communication nodes may be greater than the number m of the channels allowed to be allocated by the first communication node, and in this case s=m. The number n of the second communication nodes may also be less than the number m of the channels allowed to be allocated by the first communication node, and in this case s=n. The number n of second communication nodes may also be equal to the number m of the channels allowed to be allocated by the first communication node, and in this case, s=m, or s=n.

The channel allowed to be allocated by the first communication node refers to a channel that is not occupied. For example, the processing module inside the first communication node may learn about which channels allowed to be allocated by the the first communication node according to the usage of the channels. After these channels are allocated by the first communication node, no collision may occur when messages are transmitted. The maximum number p of channels that can be allocated by each first communication node is the same. The specific value of p is not defined here, but the number m of the channels allowed to be allocated by different first communication nodes is not completely the same.

Figure 2:
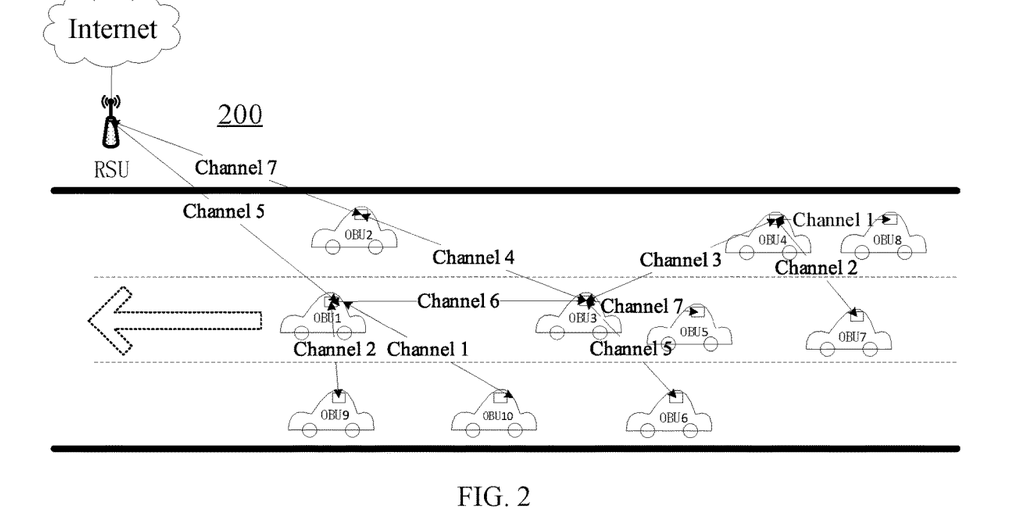
FIG. 2 is a schematic diagram of allocating a channel according to an arrangement of the present disclosure.

Here, taking the maximum number of channels that can be allocated by the first communication node is p=7 as an example, as shown in FIG. 2 (channel allocation 200), the RSU is taken as a first-level first communication node, and the number of channels allowed to be allocated when channel allocation is performed is m=7, which are respectively channel 1, channel 2, channel 3, channel 4, channel 5, channel 6 and channel 7, and the number of second communication nodes is n=2, which are OBU1 and OBU2, respectively. In this case, S=2, the RSU can arbitrarily select two of the seven channels to be allocated to OBU1 and OBU2. For example, channel 5 is allocated to OBU1 and channel 7 is allocated to OBU2. OBU1 is taken as a second-level first communication node. Since channel 5 has been allocated by the first-level first communication node for transmitting information between the RSU and OBU1, the number of channels allowed to be allocated when OBU1 performs channel allocation is m=6, which are channel 1, channel 2, channel 3, channel 4, channel 6 and channel 7, and the number of second communication nodes is n=3. OBU1 chooses to allocate channel 6 to OBU3, channel 1 to OBU10, and channel 2 to OBU9. Similarly, OBU2 is taken as a second-level first communication node, the number of channels allowed to be allocated is m=6, which are channel 1, channel 2, channel 3, channel 4, channel 5 and channel 6, and the number of second communication nodes is n=1. OBU2 chooses to allocate channel 4 to OBU3. OBU3 is taken as a third-level first communication node. Since channel 6 has been allocated by the second-level first communication node for transmitting information between the OBU1 and OBU3, the number of channels allowed to be allocated when OBU3 performs channel allocation is m=5, which are channel 1, channel 2, channel 3, channel 5 and channel 7, and the number of second communication nodes is n=3. OBU3 chooses to allocate channel 3 to OBU4, channel 7 to OBU5, and channel 5 to OBU6.

Therefore, the first communication node can only allocate the unoccupied channel to the second communication node within its communication range, and the second communication node is likely to be the first communication node of the next level. When the second communication node is the first communication node of the next level, the channel that has been allocated by the first communication node of the upper level is not allowed to be allocated by the first communication node of the current level. The specific allocation principle is not limited herein. For example, the channel may be allocated to the second communication node according to the order in which the identity feedback information is received, or may be allocated to the second communication node according to the signal strengths of the received identity feedback information, or other implementation is also possible.

Based on this, taking OBU1 as an example, the communication range of OBU1 includes OBU3, OBU9, and OBU10. After the channels are allocated using the method for allocating a channel provided by the arrangement of the present disclosure, OBU1 can communicate with OBU3 through channel 6, communicate with OBU9 through channel 2, communicate with OBU10 through channel 1 at the same time. While in the related art, in the same communication range, only two nodes can communicate with each other at a time, that is, after OBU1 completes communication with OBU3, OBU1 can perform communication with OBU9, and after that, OBU1 can perform communication with OBU10. Compared with the related art, the arrangements of the present disclosure can significantly improve the efficiency of data transmission.

In some arrangements, in order to ensure fast transmission of emergency messages, the first communication node sequentially allocates channels to the second communication nodes in an order of priorities of the access categories of the second communication nodes, until the s channels are allocated.

That is, after receiving the identity feedback information sent by all the second communication nodes, the first communication node first allocates a channel to the second communication node with an Access Category (AC) of a high priority. The ordering of AC priorities can be referred to the ordering in the 802.11 protocol. For example, there are four-priority queues, respectively AC-Voice (voice stream), AC-Video (video stream), AC-Best-effort (stream of best effort) and AC-Back-ground (back ground stream), and the higher priority the second communication node is in, the higher ability the second communication node has to preempt a channel. Alternatively, an AC-Traffic safety (traffic safety stream) is added as the highest priority information. The traffic safety flow may include, for example, traffic-related information such as traffic accident information, road congestion information, and road closure information. According to the principle of priority, when a new second communication node is added within the communication range of the first communication node during the movement of the vehicle, as long as the AC priority of the newly added second communication node is high, even other second communication nodes are still waiting for the first communication node to allocate a channel, the first communication node may first allocate a channel to the second communication node with a higher priority.

Here, the channel is used to transmit an AC with higher priority as much as possible. Therefore, if there is a second communication node with a high priority AC is not allocated with a channel, when there is an idle channel, the second communication node may preempt a channel allowed to be allocated by the first communication node. Here, the channel contention follows a distributed coordination function (DCF). If there are no other ACs of higher priorities, the second communication node will use the allocated channel. The second communication node that has no allocated channel will not send a message until the first communication node notifies the second communication node that the second communication node can send a message. The first communication node transmits a specified channel rule to each of the second communication nodes through a contention channel. The second communication node that has an allocated channel may be referred to as a determined-channel node, and the second communication node that does not have an allocated channel may be referred to as a non-determined-channel node.

Based on the periodic broadcast of the first communication node, a mechanism for relatively fixed multi-channel simultaneous transmission can be established between the first communication node and the second communication nodes, according to which, when each first communication node performs message (for example a message have a high real-time requirement such as traffic safety, road accident, and voice) broadcast again, especially when the number of second communication nodes within the communication range of the first communication node is less than the number of channels allowed to be allocated by the first communication node, the second communication nodes substantially do not need to perform window backoff or contention channels, and can directly send a message through a channel. For non-real-time messages, time for competition can also be basically eliminated, and the forwarding efficiency can be improved.

In some arrangements, channels are allocated to the second communication nodes in the order of the access category priorities of the second communication nodes from the highest to the lowest, until the s channels are all allocated, including the following steps.

In a first operation of block S20, a second communication node to be allocated a channel is selected as a target node according to an order of the access category priorities from high to low.

Here, the channels are allocated to the second communication nodes in the order of access category priorities, and after allocation to one second communication node is finished, allocation to the next communication node is performed.

In a second operation of block S20, a channel is selected from channels allowed to be allocated by the first communication node, to be allocated to the target node.

Here, a channel may be selected from channels allowed to be allocated by the first communication node in any manner, and with the channels are allocated, the number of channels allowed to be allocated by the first communication node is reducing.

In a third operation of block S20, it is identified information indicating that the currently allocated channel is suitable, which is fed back by the target node.

For example, if the target node is using the currently allocated channel, then the currently allocated channel is considered unsuitable. That is, if another first communication node is communicating with the target node through the currently allocated channel, the target node can decide that the currently allocated channel is not suitable. If another first communication node has communicated with the target node through the currently allocated channel, but the communication relationship has been released, it can be considered that the target node is not using the currently allocated channel, and the currently allocated channel is suitable. Of course, it can also be considered in combination with other factors.

That is to say, after the first communication node allocates a channel to the target node, the target node feeds back information to the first communication node. If the allocated channel is not suitable, a fourth operation of block S20 is performed, and if the allocated channel is suitable, the process directly proceeds to a fifth operation of block S20.

Here, the target node may feed information back to the first communication node when deciding that the currently allocated channel is suitable, and if the currently allocated channel is not suitable, the information is not fed back. If the first communication node does not receive the feedback information, it indicates that the information indicating that the currently allocated channel is suitable is not identified, the first communication node has to re-allocate a channel to the target node, and the fourth operation of block S20 is performed. If the first communication node receives the feedback information, it indicates that the information indicating that the currently allocated channel is suitable is identified, the first communication node does not need to re-allocate a channel to the target node, and the fifth operation of block S20 is performed.

Alternatively, it is also possible that when the target node decides that the currently allocated channel is not suitable, the target node feeds back information to the first communication node, and when target node decides that the currently allocated channel is suitable, the target node does not feed information back to the first communication node. If the first communication node receives the feedback information, it indicates that the information indicating that the currently allocated channel is suitable is not identified, the first communication node has to re-allocate a channel to the target node, and the fourth operation of block S20 is performed. If the first communication node does not receive the feedback information, it indicates that the information indicating that the currently allocated channel is suitable is identified, the first communication node does not need to re-allocate a channel to the target node, and the fifth operation of block S20 is performed.

However, other implementation is also possible.

The above feedback information is necessarily the type of information that the first communication node can identify.

In the fourth operation of block S20, if it is not identified information indicating that the currently allocated channel is suitable, a channel is selected again from the channels allowed to be allocated by the first communication node, and allocated to the target node, until all of the s channels have been tried.

That is, if the re-allocated channel is suitable, the process proceeds to the fifth operation of block S20. If all of the s channels have been tried, no suitable channel is allocated, the process also proceeds to the fifth operation of block S20, and when there is an idle channel, the channel is allocated to the second communication node. Since the access category priority of the second communication node is relatively high, the channel is preferentially allocated to the second communication node.

In the fifth operation of block S20, a channel is allocated to the next target node until the s channels are allocated.

That is, the first to fifth operations of block S20 are performed repeatedly until the s channels are allocated.

In the channel allocation process, the node B may serve as the second communication node of the node A or the second communication node of the node C. At this time, if the node A and the node C simultaneously transmit signals to the node B through channel 5, the messages will be collided, affecting the transmission effect. In view of this, in order to avoid the above situation, the second communication node decides whether the currently allocated channel is suitable after receiving the channel allocated by the first communication node, and if it is suitable, confirmation information is replied to the first communication node. If it is not suitable, the first communication node re-allocates a channel to the second communication node, thus improving the accuracy of channel allocation.

In some arrangements, when the determined number n of the second communication nodes is greater than the number m of the channels allowed to be allocated by the first communication node, the allocation of the channel is stopped for the second communication node of which the transmission opportunity reaches the maximum transmission time.

When the determined number n of the second communication nodes is less than or equal to the number m of the channels allowed to be allocated by the first communication node, each of the second communication nodes can be allocated with a channel, and therefore, it is not necessary to consider whether it is necessary to stop allocating a channel to a second communication node. However, when the determined number n of the second communication nodes is greater than the number m of the channels allowed to be allocated by the first communication node, there is at least one second communication node is waiting for the first communication node to allocate a channel, and therefore, for a second communication node of which the transmission opportunity reaches the maximum transmission time (TXOP Limit), the allocation of the channel can be stopped, and a corresponding channel is allocated to a second communication node in waiting.

In some arrangements, in order to ensure continuity of channel allocation and avoid channel allocation errors, in the first channel allocation period, an unallocated channel in the channels allowed to be allocated by the first communication node is marked as a reserved channel; and/or, in a second channel allocation period, when it is detected that a second communication node that has been allocated with a channel, has moved out of the communication range of the first communication node, the channel allocated to the second communication node is marked as a reserved channel, wherein the second channel allocation period is any channel allocation period after the first channel allocation period.

In the second channel allocation period, the reserved channel is allocated to a current unallocated second communication node, wherein the current unallocated second communication node includes a second communication node that is detected to move into the communication range of the first communication node in the second channel allocation period; and/or, a second communication node that is not allocated with a channel in a channel allocation period previous to the second channel allocation period.

Here, "and/or" is merely an association relationship describing association objects, indicating that there may be three kinds of relationships. For example, A and/or B, may indicate that only A exists, and both A and B exist, and only B exists. In addition, the character "/" herein generally indicates that the contextual objects are in an "or" relationship.

The first communication node and the second communication node use the channel allocation rule for information transmission. The first communication node periodically determines second communication nodes in its communication range. For example, the first communication node broadcasts identity request information, and the second communication node sends identity feedback information. The first communication node senses the departure of a second communication node by fail to receiving the identity feedback information in a preset time period. If a second communication node that has been allocated with a channel has moved out of the communication range of the first communication node, and there is still a second communication node that is not allocated with a channel, the first communication node allocate the cannel to the second communication node that is not allocated with a channel, otherwise such channels is reserved.

When a second communication node moves into the communication range of the first communication node, the second communication node receives the identity request information sent by the first communication node periodically, and then the second communication node sends the identity feedback information through the contention channel to the first communication node. The first communication learns about the joining of the new second communication node by receiving the identity feedback information, and checks whether there is a reserved channel, and if so, allocates the channel to the new second communication node; otherwise, the second communication node acts as a non-determined-channel node.

Here, the first communication node does not interfere with the channel of each second communication node, and the channels are similar to a connection line between two points, which is a side, rather than a plane. Therefore, the process of the first communication node allocates channels to the second communication nodes may be referred to as a side coloring channel allocation of the first communication node to the second communication nodes around it. These channels can transmit data at the same time, so the more channels there are, the higher the transmission efficiency will be. Therefore, the control channel can also be used as a data channel. Since the current Internet of Vehicles mainly adopts a 7-channel mode, that is, one control channel+six service channels, the mode can be called 7-coloring channel allocation.

The 1609.4 standard in the WAVE protocol does not give a valid broadcast strategy. Here, a side coloring broadcast mechanism is proposed based on the 7-coloring channel allocation. For example, 7 channels represent 7 colors, each first communication node uses 7 kinds of colors to color the communication links from the first communication node to second communication nodes, and colors of links in adjacent communication range cannot be the same, thus the 7 channels are allocated differently.

With the above BRTS broadcast mechanism, each second communication node accessing the Internet through a first communication node can receive the BRTS, and the first communication node located in the self-organizing network area performs channel allocation according to the 7-coloring channel allocation rule, establishing a 7-coloring broadcast network. Then, each first communication node stores therein a channel coloring list, as shown in Table 3, which specifies the channel allocation around the self-organizing node. A non-determined-channel node has no determined channel, and is waiting for notification from other first communication node.

TABLE 3

Channel Coloring List

| Second Communication Node Address | Number of Channel | whether has a determined channel |
|---|---|---|
| Address 1 | Channel 1 | Yes |
| Address 2 | Channel 2 | Yes |
| Address 3 | Channel 3 | Yes |
| . . . | . . . | Yes |
| Address 7 | Channel 7 | Yes |
| Address 8 | | No |
| . . . | . . . | No |
| Address n | | No |

In channel coloring broadcast, channel allocation can be divided into at least two time periods, a first channel allocation period and a second channel allocation period.

Figure 3:
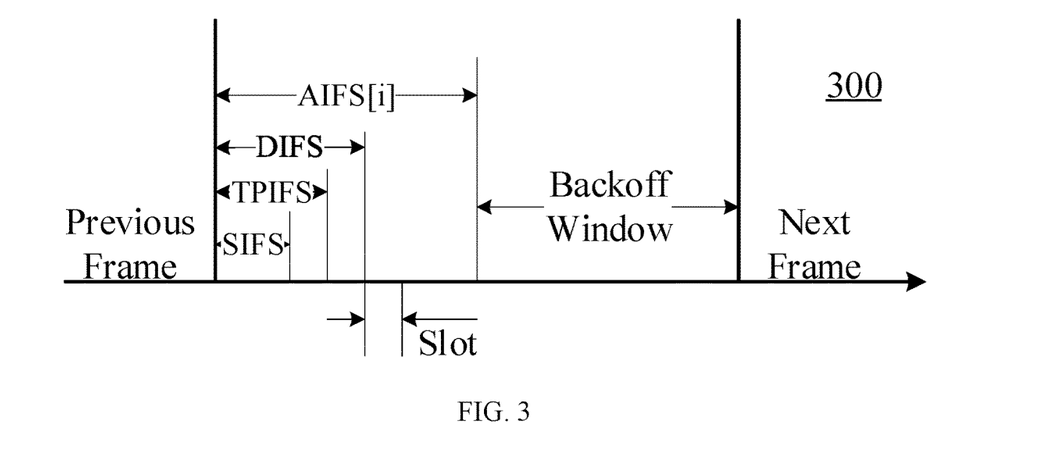
FIG. 3 is a schematic diagram shows a relationship between frames according to an arrangement of the present disclosure.

The first channel allocation period indicates direct access through a colored channel in the channel coloring list, and the second channel allocation period indicates a stage for non-determined-channel node competing for a channel. The first channel allocation period may be considered as a center point coordination function (PCF) of a temporary center point, with the first communication node being the temporary center point, and a backoff starting time in the Carrier Sense Multiple Access with Collision Avoidance (CAMS/CA) referred to as temporary point inter-frame spacing (TPIFS), as shown in FIG. 3 (showing relationship 300). The remaining is the as the related art, details of which will not be described herein.

Figure 4A:
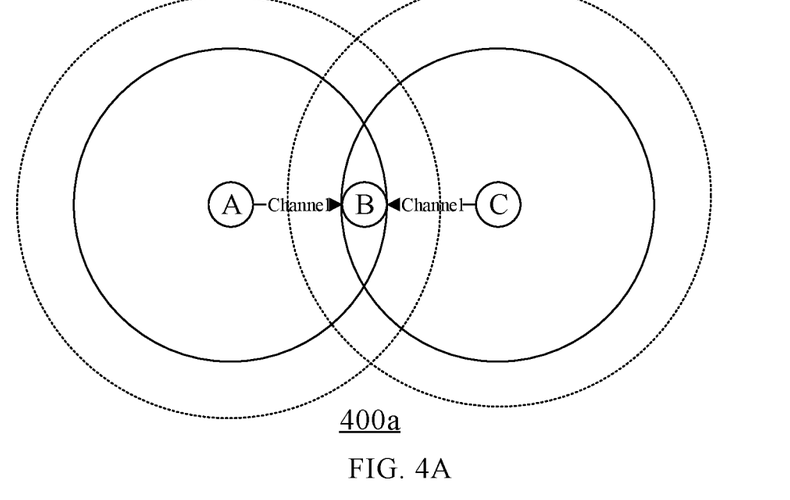
FIG. 4A and FIG. 4B show an exemplary communication relationship between nodes according to an arrangement of the present disclosure.

As shown in FIG. 4A (communication relationship 400a), the dotted-line circle represents the detection range of the node, and the solid-line circle represents the communication range of the node. If node A wants to send information to node B, then node A first listens. Node A finds that there is a node B in its own transmission range, and node A can send information to node B. But there is no node C in the listening range of node A, so node A does not know that node C is transmitting information to node B. Then, node A sends information to node B, and node C also sends information to node B as a hidden node. At this time, Node B receives the information sent by Node A and Node C at the same time. Since the related art can only use one channel to transmit information, and the channels are the same, the frequency range of the message is also the same, the frequency ranges of the messages sent by the node A and the node C to the node B are the same, so that messages in the same frequency range are superimposed, and Node B cannot identify the superimposed information. That is, the message collides and the delivery fails, resulting in the hidden station problem.

Figure 4B:
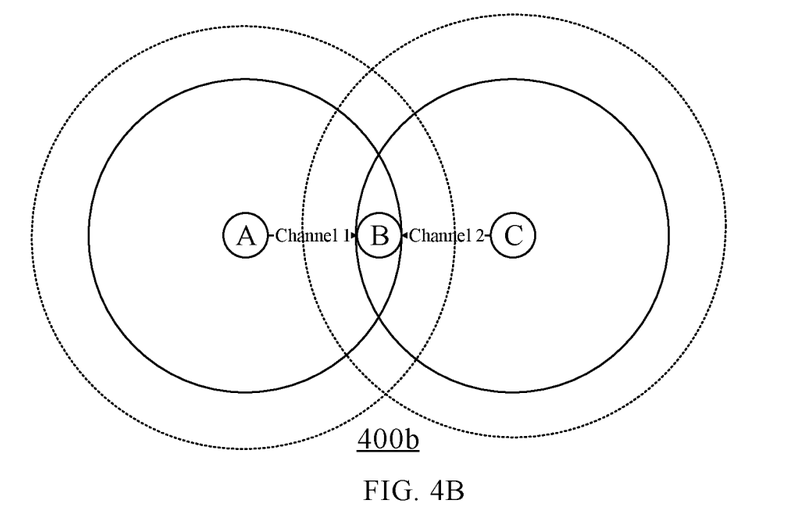

The present disclosure provides side coloring channel allocation, as shown in FIG. 4B (communication relationship 400b), if node B is the first communication node, the node B allocates different channels to the node A and the node C in the communication range respectively during the channel allocation process. If the node B serves as both the second communication node of the node A and the second communication node of the node C, in the channel allocation process, after the node A allocates the channel 1 to the node B, the communication between the two is normal. If the node C also allocates channel 1 to the node B, the node B will feed information back indicating that the channel 1 is unsuitable, to make the node C to allocate a channel other than the channel 1 to the node B, in order to make communication between Node B and Node A and Node B and Node C use different channels. Based on this, in the communication process, node A sends information to node B through channel 1, node C sends information to node B through channel 2, and the messages sent by node A and node C belong to different frequency ranges. Therefore, node B can simultaneously access information sent by node A and node C within the communication range through two different channels, thus avoiding the hidden station problem.

Figure 5A:
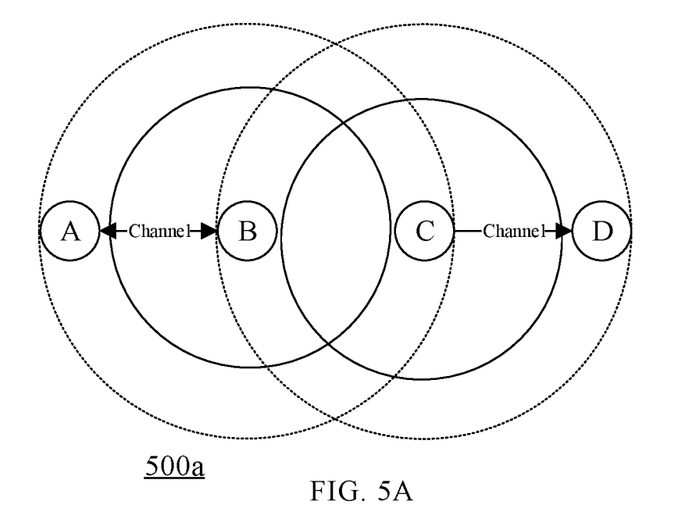
FIG. 5A and FIG. 5B show another exemplary communication relationship between nodes according to an arrangement of the present disclosure.

As shown in FIG. 5A (communication relationship 500a), the dotted-line circle represents the detection range of the node, and the solid-line circle represents the communication range of the node. In the related art, when the node C is using a channel to send information to the node D, and node B has information to be transmitted to node A, but node C is located in the detection range of the node B, and the node B detects that the node C is using the channel, node C is an exposed node and node B has to back off and does not transmit information to node A, causing the exposure station problem. Moreover, node B does not reply the information sent by node A, which makes node A fails to transmit and also backs off. This may continuously expand the competition window. This makes node A to wait, and cannot complete message transmission between node A and node B, triggering fairness problem.

Figure 5B:
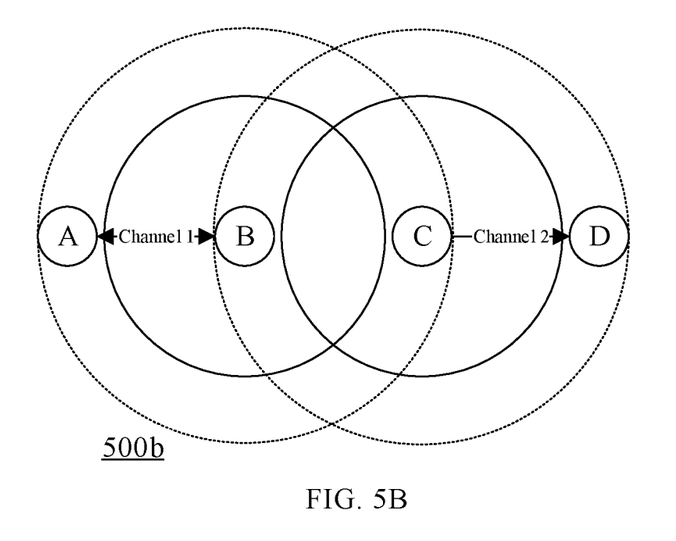

The present disclosure provides side coloring channel allocation, as shown in FIG. 5B (communication relationship 500b), node B detects that node C is using channel 2 to transmit information to node D, and by channel coloring, the Node B selects a channel other than channel 2 (for example, Channel 1) to transmit information to and from node A. Therefore, while node C is sending a message to node D through channel 2, node B may send a message to node A through channel 1. Node B does not need to back off, which can perfectly solve the exposed station problem. In addition, since the message transmission between the node A and the node B does not need to wait until the end of the message transmission between the node C and the node D, and adopts a different channel, so that the transmission failure of node A does not occur anymore, and the fairness problem can be well solved.

In the present disclosure, the first communication node performs channel allocation to the second communication nodes within the communication range when transmitting the message, so that the second communication nodes in the same communication range may use different channels for simultaneous data transmission. Multiple channels can work at the same time. Compared with the related art in which only one channel can work, the present disclosure can solve the problems of hidden stations, exposed stations and channel access fairness, thus improving the efficiency in broadcast and data transmission of the MAC layer in the Internet of Vehicles environment. Based on this, the present disclosure can also adopt a broadcast mechanism when transmitting a message.

In some arrangements, the method for allocating a channel further includes:

detecting whether a signal strength transmitted by a third communication node is lower than a threshold; and when it is detected that the strength is lower than the threshold, performing a step of determining a second communication node in the Internet of Vehicles in the first channel allocation period; wherein the third communication node is a communication node that allocates a channel to the first communication node.

That is, when the first communication node detects that the strength of the signal transmitted by the third communication node is lower than the threshold, the first communication node can start to broadcast as the first communication node of the next level, wherein the first communication node serves as the next level of the third communication node, similar to OBU1 and OBU3 in FIG. 2.

In the Internet of Vehicles, each RSU can periodically broadcast BRTS to its communication range, and each second communication node that receives this BRTS checks the strength of the signal between itself and the first communication node. If the strength is lower than a certain threshold (the threshold is determined by the transmission quality of the second communication node), the second communication then can broadcast the BRTS (as the first communication node of the next level) so that a second communication node access to the RSU in a self-organizing manner can receive the BRTS. Then, the first communication node of the next level rebroadcasts the BRTS to a further second communication node, and so on, until all the communication nodes accessing the Internet through the RSU receive the BRTS. Here, each second communication node accesses the Internet through only one RSU, and stores the MAC address of this RSU. In addition, in order to avoid repeated reception of the BRTS, each self-organizing second communication node sets a timer once it receives a BRTS, and no longer receives a broadcast packet of the RSU during the time period, wherein the time value of the timer may be determined according to the specific network environment.

In some arrangements, detecting whether the strength of the signal transmitted by the third communication node is lower than a threshold; if it is detected that the strength is lower than the threshold, detecting whether start communication information broadcast by the third communication node is received, the start communication information is used for notifying the first communication node to start broadcasting; and when receiving the start communication information, performing the step of determining the second communication node in the Internet of Vehicles in the first channel allocation period.

That is to say, the first communication node performs communication after receiving the instruction to start communication transmitted by the upper level.

Since the address of the first communication node is stored in the broadcast BRTS, to distinguish which first communication node is performing channel coloring. In order to avoid excessive collisions caused by BRTS broadcast, arrangements of the present disclosure limit the speed of broadcast according to the density of the vehicles. That is, when the vehicle density is large, the point-by-point broadcast BRTS may be selected to be used. Every time the broadcast reaches a first communication node, the first communication node does not broadcast the BRTS immediately, but waits for the third communication node that broadcasted to it to send a message to notify it to broadcast. When the vehicles are sparse, the first communication node can be selected with a probabilistic choice to broadcast immediately, or the time of its broadcast can be selectively specified according to the density of the surrounding vehicles.

An arrangement of the present disclosure provides a system for allocating a channel, including: a node determining module configured to cause a first communication node in an Internet of Vehicles to determine a second communication node in the Internet of Vehicles in a first channel allocation period, the second communication node being a communication node other than the first communication node in a communication range of the first communication node; and a channel coloring module configured to allocate s channels among channels allowed to be allocated by the first communication node to s second communication nodes, wherein different channels are allocated to different second communication nodes, s is a smaller value of n and m, n is a determined number of second communication nodes, m is a number of channels allowed to be allocated by the first communication node.

In the system for allocating a channel provided by the arrangement of the present disclosure, the channel coloring module performs channel allocation to the second communication node within the communication range of the first communication node, so that the second communication nodes in the same communication range may use different channels for simultaneous data transmission with the first communication node. Multiple channels can work at the same time. Compared with the related art in which only one channel can work, the present disclosure can solve the problems of hidden stations, exposed stations and channel access fairness, thus improving the efficiency in broadcast and data transmission of the MAC layer in the Internet of Vehicles environment. Based on this, the present disclosure can also adopt a broadcast mechanism when transmitting a message.

In some arrangements, the system for allocating a channel further includes a channel marking module configured to, in the first channel allocation period, mark an unallocated channel in the channels allowed to be allocated by the first communication node as a reserved channel; and/or, in a second channel allocation period, when it is detected that a second communication node that has been allocated with a channel, has moved out of the communication range of the first communication node, mark the channel allocated to the second communication node as a reserved channel, wherein the second channel allocation period is any channel allocation period after the first channel allocation period.

The channel coloring module is further configured to, in the second channel allocation period, allocate the reserved channel to a current unallocated second communication node, wherein the current unallocated second communication node includes a second communication node that is detected to move into the communication range of the first communication node in the second channel allocation period; and/or, a second communication node that is not allocated with a channel in a channel allocation period previous to the second channel allocation period.

Here, "and/or" is merely an association relationship describing association objects, indicating that there may be three kinds of relationships. For example, A and/or B, may indicate that only A exists, and both A and B exist, and only B exists. In addition, the character "/" herein generally indicates that the contextual objects are in an "or" relationship.

Here, by updating the address information of the second communication node and the information of the reserved channel, and continuously performing channel allocation, a mechanism for relatively fixed multi-channel simultaneous transmission between the first communication node and the second communication node can be established.

In some arrangements, the node determining module is configured to broadcast identity request information, and the identity request information is used to request an identifier of the second communication node.

The identity feedback information sent by the second communication node is receiving through the channel, and the identifier of the second communication node included in the received identity feedback information is recorded.

When at least two second communication nodes send identity feedback information through the same channel, the process returns to the step of broadcasting identity request information until there are no at least two second communication nodes sending identity feedback information through the same channel.

In order to ensure that the important information is preferentially transmitted, in some arrangements, the channel coloring module is configured to sequentially allocate channels to the second communication nodes in an order of priorities of the access categories of the second communication nodes, until the s channels are allocated.

In some arrangements, the channel coloring module is further configured to, when the determined number n of the second communication nodes is greater than the number m of the channels allowed to be allocated by the first communication node, stop the allocation of the channel for a second communication node of which a transmission opportunity reaches the maximum transmission time.

In order to improve the transmission quality of the information, avoid that some of the second communication nodes wait too long, resulting in signal delay transmission, the allocation of the channel is stopped for a second communication node of which a transmission opportunity reaches the maximum transmission time, so as to release the channel.

In some arrangements, the system for allocating a channel further includes: a processing module configured to detect whether a signal strength transmitted by a third communication node is lower than a threshold; and when it is detected that the strength is lower than the threshold, cause the node determining module to determine a second communication node in the Internet of Vehicles in the first channel allocation period; wherein the third communication node is a communication node that allocates a channel to the first communication node.

Here, a second communication node distanced further to the first communication node is taken as a first communication node of a next level, so that all the surrounding OBUs can receive the BRTS, which can increase the signal transmission range.

In some arrangements, the processing module is further configured to detect whether start communication information broadcast by the third communication node is received, wherein the start communication information is used for notifying the first communication node to start broadcasting.

When the start communication information is received, the node determining node determines the second communication node in the Internet of Vehicles in the first channel allocation period.

Arrangements of the present disclosure limit the speed of broadcasting according to the density of the vehicles. That is, when the vehicle density is large, the point-by-point broadcast BRTS may be selected to be used. Every time the broadcast reaches a first communication node, the first communication node does not broadcast the BRTS immediately, but waits for the third communication node that broadcasted to it to send a message to notify it to broadcast. In this way, it can avoid too many BRTS broadcasts causing excessive collisions.

An arrangement of the present disclosure further provides a computer readable storage medium, wherein the computer readable storage medium stores instructions, when the instructions are run in a system for allocating a channel, the system for allocating a channel is caused to perform the above method for allocating a channel.

An arrangement of the present disclosure also provide a computer program product including instructions, when the computer program product is run in a system for allocating a channel, the system for allocating a channel is caused to perform the above method for allocating a channel.

Through the description of the above arrangements, those skilled in the art can clearly understand that for the convenience and brevity of the description, only the division of the above functional modules is illustrated. In practical applications, the above functions can be allocated to different functional modules according to needs, that is, the internal structure of the system can be divided into different functional modules to complete all or part of the functions described above.

In the several arrangements provided herein, it should be understood that the disclosed systems and methods can be implemented in other ways. For example, the system arrangement described above is merely illustrative. For example, the division of the module or unit is only a logical function division. In actual implementation, there may be another division manner, for example, multiple units or components may be combined or integrated into another system, or some features can be ignored or not executed.

In addition, each functional unit in each arrangement of the present disclosure may be integrated into one processing unit, or each unit may exist physically separately, or two or more units may be integrated into one unit. The above integrated unit can be implemented in the form of hardware or in the form of software functional units.

An integrated unit can be stored in a readable storage medium if it is implemented as a software functional unit and sold or used as a standalone product. Based on such understanding, the technical solution of the arrangements of the present disclosure may, in essence, or with the part contributing to the prior art or all or part of the technical solution, embodied in the form of a software product stored in a storage medium including a number of instructions to cause a device (which may be a microcontroller, chip, etc.) or a processor to perform all or part of the steps of the methods described in various arrangements of the present disclosure. The foregoing storage medium includes: a U disk, a mobile hard disk, a read-only memory (ROM), a random access memory (RAM), a magnetic disk, or an optical disk, and the like, which can store program codes.

The above is only specific arrangements of the present disclosure, but the protection scope of the present disclosure is not limited thereto. Variations or substitutions readily envisaged by any person skilled in the art within the technical scope of the present disclosure should be covered by the protection scope of the present disclosure. Therefore, the protection scope of the present disclosure should be subject to the protection scope of the appended claims.

What is claimed is:

1. A method for allocating a channel, comprising:
   determining, by a first communication node in an Internet of Vehicles, a second communication node in the Internet of Vehicles in a first channel allocation period, the second communication node being a communication node other than the first communication node in a communication range of the first communication node;
   allocating s channels among channels allowed to be allocated by the first communication node to s ones of the second communication nodes, wherein different channels are allocated to different second communication nodes, s is a smaller value of n and m, n is a determined number of the communication nodes, and m is a number of channels allowed to be allocated by the first communication node; and
   detecting whether a signal strength transmitted by a third communication node is lower than a threshold; and when detecting that the signal strength is lower than the threshold, performing the step of determining a second communication node in the Internet of Vehicles in the first channel allocation period,
   wherein the third communication node is a communication node that allocates a channel to the first communication node.

2. The method for allocating a channel according to claim 1, further comprising at least one of:
   in the first channel allocation period, marking an unallocated channel in the m channels allowed to be allocated by the first communication node as a reserved channel; and
   in a second channel allocation period, when detecting that one of the s communication nodes that has been allocated with a channel, has moved out of the communication range of the first communication node, marking the channel allocated to the second communication node as a reserved channel, wherein the second channel allocation period is any of a plurality of channel allocation periods after the first channel allocation period.

3. The method for allocating a channel according to claim 2, further comprising:
   in the second channel allocation period, allocating the reserved channel to a current unallocated second communication node, wherein the current unallocated second communication node comprises at least one of:
   a first one of the s communication nodes that is detected to move into the communication range of the first communication node in the second channel allocation period, and
   a second one of the s communication nodes that is not allocated with a channel in a channel allocation period previous to the second channel allocation period.

4. The method for allocating a channel according to claim 1, wherein determining a second communication node in the Internet of Vehicles in a first channel allocation period comprises:
   broadcasting identity request information, the identity request information being used to request an identifier of the second communication node;
   receiving identity feedback information sent by the second communication node through a channel, and recording an identifier of the second communication node comprised in the received identity feedback information; and
   when at least two second communication nodes send identity feedback information through the same channel, returning to the step of broadcasting identity request information until there are no at least two of the s communication nodes sending identity feedback information through the same channel.

5. The method for allocating a channel according to claim 4, wherein allocating s channels among channels allowed to be allocated by the first communication node to s communication nodes further comprises:
   when the determined number n of the communication nodes is greater than the number m of the channels allowed to be allocated by the first communication node, stopping the allocation of the channel for one of the s communication nodes of which a transmission opportunity reaches a maximum transmission time.

6. The method for allocating a channel according to claim 1, wherein allocating s channels among channels allowed to be allocated by the first communication node to s communication nodes comprises:
   sequentially allocating channels to the s communication nodes in an order of priorities of access categories of the s communication nodes, until the s channels are allocated.

7. The method for allocating a channel according to claim 6, wherein sequentially allocating channels to the s communication nodes in an order of priorities of access categories of the s communication nodes, until the s channels are allocated comprises:
   selecting a first one of the s communication node to be allocated a channel as a target node according to the order of the priorities of the access categories of the s communication nodes from high to low;
   selecting a channel from the channels allowed to be allocated by the first communication node, to be allocated to the target node;
   identifying information indicating that the currently allocated channel is suitable, which is fed back by the target node;

when no information indicating that the currently allocated channel is suitable is identified, selecting a channel again from the channels allowed to be allocated by the first communication node, and allocating the same to the target node, until all of the s channels have been tried; and allocating a channel to a next target node until the s channels are allocated.

8. The method for allocating a channel according to claim 1, wherein before the step of determining a second communication node in the Internet of Vehicles in the first channel allocation period, the method further comprises:

detecting whether start communication information broadcast by the third communication node is received, wherein the start communication information is used for notifying the first communication node to start broadcasting; and when the start communication information is received, performing the step of determining a second communication node in the Internet of Vehicles in the first channel allocation period.

9. A system for allocating a channel, comprising:

a node determining module configured to cause a first communication node in an Internet of Vehicles to determine a second communication node in the Internet of Vehicles in a first channel allocation period, the second communication node being a communication node other than the first communication node in a communication range of the first communication node;

a channel coloring module configured to allocate s ones of the second channels among channels allowed to be allocated by the first communication node to s communication nodes, wherein different channels are allocated to different second communication nodes, s is a smaller value of n and m, n is a determined number of second communication nodes, m is a number of channels allowed to be allocated by the first communication node;

a processing module configured to detect whether a signal strength transmitted by a third communication node is lower than a threshold; and when detecting that the strength is lower than the threshold, cause the node determining module to determine one of the s communication nodes in the Internet of Vehicles in the first channel allocation period, wherein the third communication node is a communication node that allocates a channel to the first communication node.

10. The system for allocating a channel according to claim 9, further comprising:

a channel marking module configured to perform at least one of:

in the first channel allocation period, marking an unallocated channel in the channels allowed to be allocated by the first communication node as a reserved channel; and, in a second channel allocation period, when detecting that one of the s communication node that has been allocated with a channel, has moved out of the communication range of the first communication node, marking the channel allocated to the second communication node as a reserved channel, wherein the second channel allocation period is any channel allocation period after the first channel allocation period.

11. The system for allocating a channel according to claim 10, wherein the channel coloring module is further configured to, in the second channel allocation period, allocate the reserved channel to a current unallocated one of the s communication nodes, wherein the current unallocated communication node comprises at least one of: a first one of the s communication node that is detected to move into the communication range of the first communication node in the second channel allocation period, and a second one of the s communication nodes that is not allocated with a channel in a channel allocation period previous to the second channel allocation period.

12. The system for allocating a channel according to claim 9, wherein the node determining module is configured to broadcast identity request information, and the identity request information is used to request an identifier of the second communication node;

receive identity feedback information sent by the second communication node through a channel, and record an identifier of the second communication node comprised in the received identity feedback information;

when at least two of the s communication nodes send identity feedback information through the same channel, return to the step of broadcasting identity request information until there are no at least two of the s communication nodes sending identity feedback information through the same channel.

13. The system for allocating a channel according to claim 9, wherein the channel coloring module is configured to sequentially allocate channels to the s communication nodes in an order of priorities of access categories of the s communication nodes, until the s channels are allocated.

14. The system for allocating a channel according to claim 13, wherein the channel coloring module is configured to:

select one of the s communication nodes to be allocated a channel as a target node according to the order of the priorities of the access categories of the s communication nodes from high to low; select a channel from the channels allowed to be allocated by the first communication node, to be allocated to the target node;

identify information indicating that the currently allocated channel is suitable, which is fed back by the target node; when no information indicating that the currently allocated channel is suitable is identified, select a channel again from the channels allowed to be allocated by the first communication node, and allocate the same to the target node, until all of the s channels have been tried; and allocate a channel to a next target node until the s channels are allocated.

15. The system for allocating a channel according to claim 13, wherein the channel coloring module is further configured to, when the determined number n of the s communication nodes is greater than the number m of the channels allowed to be allocated by the first communication node, stop the allocation of the channel for one of the s communication nodes of which a transmission opportunity reaches the maximum transmission time.

16. The system for allocating a channel according to claim 9, wherein the processing module is further configured to detect whether start communication information broadcast by the third communication node is received, wherein the start communication information is used for notifying the first communication node to start broadcasting; and when the start communication information is received, the node determining node determines the second communication node in the Internet of Vehicles in the first channel allocation period.

17. A non-transitory computer readable storage medium having stored therein instructions, wherein when the instructions are run in a system for allocating a channel, the system for allocating a channel is caused to perform:

determining, by a first communication node in an Internet of Vehicles, a second communication node in the Internet of Vehicles in a first channel allocation period, the second communication node being a communication node other than the first communication node in a communication range of the first communication node;

allocating s channels among channels allowed to be allocated by the first communication node to s ones of the second communication nodes, wherein different channels are allocated to different second communication nodes, s is a smaller value of n and m, n is a determined number of the communication nodes, and m is a number of channels allowed to be allocated by the first communication node; and detecting whether a signal strength transmitted by a third communication node is lower than a threshold; and when detecting that the signal strength is lower than the threshold, performing the step of determining a second communication node in the Internet of Vehicles in the first channel allocation period, wherein the third communication node is a communication node that allocates a channel to the first communication node.

* * * * *